US011171757B2

(12) United States Patent
Chun et al.

(10) Patent No.: US 11,171,757 B2
(45) Date of Patent: Nov. 9, 2021

(54) ACK/NACK SIGNAL PROCESSING METHOD AND DEVICE FOR UPLINK MULTI-USER TRANSMISSION

(71) Applicant: LG ELECTRONICS INC., Seoul (KR)

(72) Inventors: Jinyoung Chun, Seoul (KR); Kiseon Ryu, Seoul (KR); Hangyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/762,084

(22) PCT Filed: Oct. 6, 2016

(86) PCT No.: PCT/KR2016/011204
§ 371 (c)(1),
(2) Date: Mar. 21, 2018

(87) PCT Pub. No.: WO2017/061797
PCT Pub. Date: Apr. 13, 2017

(65) Prior Publication Data
US 2018/0262315 A1 Sep. 13, 2018

Related U.S. Application Data
(60) Provisional application No. 62/238,146, filed on Oct. 7, 2015.

(51) Int. Cl.
*H04L 5/00* (2006.01)
*H04W 84/12* (2009.01)
(Continued)

(52) U.S. Cl.
CPC .......... *H04L 5/0055* (2013.01); *H04L 1/1685* (2013.01); *H04L 5/00* (2013.01); *H04W 84/12* (2013.01); *H04W 88/08* (2013.01)

(58) Field of Classification Search
CPC .......... H04L 5/0055; H04L 1/18; H04L 5/00; H04W 84/12; H04W 88/08
See application file for complete search history.

(56) References Cited

U.S. PATENT DOCUMENTS

2007/0153760 A1* 7/2007 Shapira ............... H04B 7/2681
370/350
2007/0206508 A1* 9/2007 Sammour ............ H04W 28/06
370/252
(Continued)

FOREIGN PATENT DOCUMENTS

CN          102859924       1/2013
CN          103095425       5/2013
(Continued)

OTHER PUBLICATIONS

PCT International Application No. PCT/KR2016/011204, International Search Report dated Jan. 24, 2017, 25 pages.
(Continued)

*Primary Examiner* — Christopher M Crutchfield
*Assistant Examiner* — Tito Q Pham
(74) *Attorney, Agent, or Firm* — Fish & Richardson P.C.

(57) ABSTRACT

The present document relates to a method and device for an Access Point (AP) to transmit ACK/NACK signals for MU (Multi-User) transmission data of a plurality of stations (STA) in a wireless LAN (WLAN) system. To this end, the method and device are characterized in that a STA responds to a trigger frame received from an AP, transmits data to the AP through an MU access technique, and sets an ACK policy value for data transmitted on the basis of the trigger frame to another value other than a first ACK policy value requesting an ACK signal transmission on the basis of a block ACK request.

10 Claims, 14 Drawing Sheets

(51) Int. Cl.
*H04W 88/08* (2009.01)
*H04L 1/16* (2006.01)

(56) References Cited

U.S. PATENT DOCUMENTS

| | | | |
|---|---|---|---|
| 2010/0195552 A1* | 8/2010 | Ho | H04W 52/0216 370/311 |
| 2011/0038332 A1 | 2/2011 | Liu et al. | |
| 2011/0235596 A1* | 9/2011 | Wentink | H04W 72/1284 370/329 |
| 2011/0261742 A1* | 10/2011 | Wentink | H04L 1/1854 370/312 |
| 2012/0314697 A1 | 12/2012 | Noh et al. | |
| 2013/0089047 A1 | 4/2013 | Wentink | |
| 2013/0142099 A1* | 6/2013 | Shirakata | H04W 52/028 370/311 |
| 2013/0301569 A1* | 11/2013 | Wang | H04L 1/1854 370/329 |
| 2015/0063320 A1* | 3/2015 | Merlin | H04L 47/12 370/336 |
| 2015/0173014 A1 | 6/2015 | Lee et al. | |
| 2016/0088602 A1* | 3/2016 | Seok | H04L 5/0055 370/338 |
| 2018/0034595 A1 | 2/2018 | Kim et al. | |

FOREIGN PATENT DOCUMENTS

| | | |
|---|---|---|
| JP | 2013502157 | 1/2013 |
| WO | 2014179478 | 11/2014 |
| WO | 2015068968 | 5/2015 |
| WO | 2016/126055 | 8/2016 |

OTHER PUBLICATIONS

Ghosh, C. et al., "DL Sounding Sequence with UL MU Feedback", doc.: IEEE 802.11-15/1103r0, Sep. 2015, 18 pages.
European patent application No. 16853913.8, European search report dated May 16, 2019, 10 pages.
Merlin et al., "ACK Protocol and Backoff Procedure for MU-MIMO," XP017676193, IEEE 802.11-10/1192r0, Sep. 14, 2010, 15 pages.
Jeongki Kim et al., "Further consideration on Multi-STA Block ACK," IEEE 802.11-15/0626r1, May 11, 2015, 16 pages.
European Patent Office Application No. 16853913.8, Office Action dated Apr. 1, 2020, 6 pages.
The State Intellectual Property Office of the People's Republic of China Application No. 201680058357.2, Office Action dated Apr. 30, 2020, 11 pages.

* cited by examiner

# ACK/NACK SIGNAL PROCESSING METHOD AND DEVICE FOR UPLINK MULTI-USER TRANSMISSION

CROSS-REFERENCE TO RELATED APPLICATIONS

This application is the National Stage filing under 35 U.S.C. 371 of International Application No. PCT/KR2016/011204, filed on Oct. 6, 2016, which claims the benefit of U.S. Provisional Application No. 62/238,146, filed on Oct. 7, 2015, the contents of which are all hereby incorporated by reference herein in their entirety.

TECHNICAL FIELD

The present disclosure relates to a method and apparatus for transmitting and receiving an Acknowledgment/Negative Acknowledgment (ACK/NACK) signal for multi-user or multi-Station (STA) data, based on an ACK policy value in a Wireless Local Area Network (WLAN) system.

BACKGROUND ART

WLAN technology has been standardized as Institute of Electrical and Electronics Engineers (IEEE) 802.11. IEEE 802.11a and IEEE 802.11b use an unlicensed band at 2.4 GHz or 5 GHz. IEEE 802.11b provides a transmission rate of 11 Mbps, and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbit/s for eight spatial streams, and IEEE 802.11ax standardization is under discussion.

DISCLOSURE

Technical Problem

In the IEEE 802.11ax standard, Uplink (UL) Orthogonal Frequency Division Multiple Access (OFDMA) transmission and UL Multi-User (MU) transmission will be used. Thus, an Access Point (AP) may receive UL MU frames from a plurality of Stations (STAs) in the same transmission opportunity and needs to transmit an Acknowledgement (ACK) frame in response to the UL MU frames.

In this case, efficient transmission of Acknowledgement/Negative Acknowledgement (ACK/NACK) signals to a plurality of STAs in a Block ACK (BA) frame may be considered. However, overhead may be problematic due to an increased size of an MU BA or M-BA frame for the plurality of STAs.

Moreover, if some of the plurality of STAs request a BA and others request a normal ACK, the procedure becomes complex and an ACK/NACK operation may be delayed.

Hereinafter, a method and apparatus for efficiently transmitting an ACK/NACK signal in the above-described UL MU transmission situation will be described.

Technical Solution

In an aspect of the present disclosure, a method for accessing an access point (AP) in a multi-user scheme by a station (STA) in a wireless local area network (WLAN) system includes receiving a trigger frame from the AP, and transmitting data to the AP in a multi-user access scheme in response to the trigger frame. The STA sets an ACK policy value for the data transmitted based on the trigger frame to a value other than a first ACK policy value requesting transmission of an ACK signal based on a block ACK request.

The STA may set the ACK policy value for the data transmitted based on the trigger frame to a second ACK policy value requesting a normal ACK or an immediate transmission block ACK request.

The method may further include, after transmission of the data with the ACK policy value set to the second ACK policy value, receiving an ACK/NACK signal for the data from the AP.

The ACK/NACK signal may be received a short interframe space (SIFS) after the transmission of the data with the ACK policy value set to the second ACK policy value.

If downlink data is received in a multi-user scheme from the AP, an ACK policy value for the downlink data may be set to one of a plurality of ACK policy values including the first ACK policy value.

The plurality of ACK policy values may include '01' requesting a normal ACK or an immediate transmission block ACK request, '01' requesting no ACK, '10' requesting no explicit ACK or a power save multi-poll (PSMP) ACK, and '11' requesting an ACK based on a block ACK request.

The first ACK policy value may be '11', and the second ACK policy value may be '00'.

In another aspect of the present disclosure, a STA for accessing an AP in a multi-user scheme in a WLAN system includes a transceiver configured to receive a trigger frame from the AP, and transmit data to the AP in a multi-user access scheme in response to the trigger frame, and a processor connected to the transceiver and configured to provide the data to the transceiver. The processor is configured to set an ACK policy value for the data transmitted based on the trigger frame to a value other than a first ACK policy value requesting transmission of an ACK signal based on a block ACK request.

The processor may be configured to set the ACK policy value for the data transmitted based on the trigger frame to a second ACK policy value requesting a normal ACK or an immediate transmission block ACK request.

If the transceiver receives downlink data in a multi-user scheme from the AP, the processor may be configured to check an ACK policy value for the downlink data set to one of a plurality of ACK policy values including the first ACK policy value.

In another aspect of the present disclosure, a method for receiving data from a plurality of STAs in a multi-user scheme by an AP in a WLAN system includes transmitting a trigger frame to the plurality of STAs, and receiving data from the plurality of STAs in a multi-user access scheme. An ACK policy value for the data received after the transmission of the trigger frame is set to a value other than a first ACK policy value requesting transmission of an ACK signal based on a block ACK request.

The ACK policy value for the data received after the transmission of the trigger frame may be set to a second ACK policy value requesting a normal ACK or an immediate transmission block ACK request.

If the AP transmits downlink data to the plurality of STAs in a multi-user scheme, the AP may set an ACK policy value for the downlink data to one of a plurality of ACK policy values including the first ACK policy value.

In another aspect of the present disclosure, an AP for receiving data from a plurality of STAs in a multi-user scheme in a WLAN system includes a transceiver configured to transmit a trigger frame to the plurality of STAs, and receive data from the plurality of STAs in a multi-user access scheme, and a processor connected to the transceiver and configured to process the data. The processor is configured to operate in response to an ACK policy value for the data set to a value other than a first ACK policy value requesting transmission of an ACK signal based on a block ACK request.

The ACK policy value for the data received after the transmission of the trigger frame may be set to a second ACK policy value requesting a normal ACK or an immediate transmission block ACK request.

Advantageous Effects

According to the present disclosure as described above, an Access Point (AP) may efficiently transmit Acknowledgment/Negative Acknowledgment (ACK/NACK) signals to a plurality of Stations (STAs) in an Uplink (UL) Multi-User (MU) transmission situation.

BEST MODE FOR CARRYING OUT THE INVENTION

Reference will now be made in detail to the exemplary embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure.

The following detailed description includes specific details in order to provide a thorough understanding of the present disclosure. However, it will be apparent to those skilled in the art that the present disclosure may be practiced without such specific details. In some instances, known structures and devices are omitted or are shown in block diagram form, focusing on important features of the structures and devices, so as not to obscure the concept of the present disclosure.

As described above, the following description relates to a method for efficiently utilizing a channel having a wide band in a Wireless Local Area Network (WLAN) system and an apparatus therefor. To this end, a WLAN system to which the present disclosure is applicable will first be described in detail.

Figure 1:
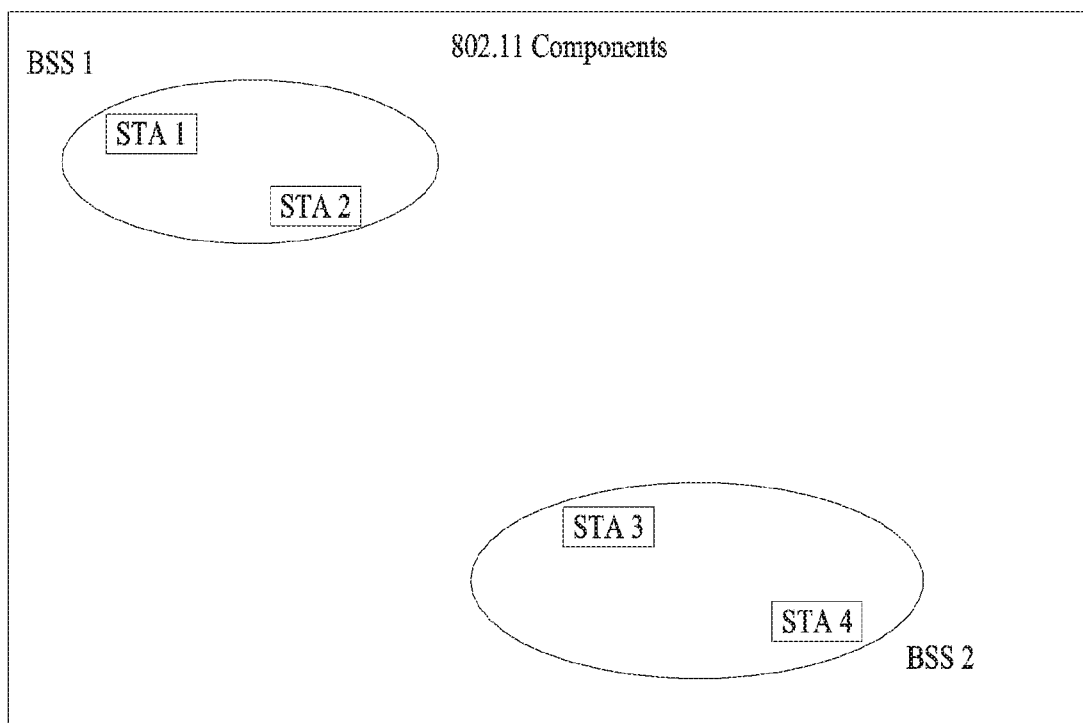
FIG. 1 is a view illustrating an exemplary configuration of a Wireless Local Area Network (WLAN) system.

FIG. 1 is a view illustrating an exemplary configuration of a WLAN system.

As illustrated in FIG. 1, the WLAN system includes at least one Basic Service Set (BSS). A BSS is a set of Stations (STAs) that are able to communicate with each other by successful synchronization.

A STA is a logical entity including a physical layer interface between a Media Access Control (MAC) layer and a wireless medium. The STA may be any of an Access Point (AP) and a non-AP STA. Among STAs, a portable terminal manipulated by a user is a non-AP STA. If a terminal is simply called a STA, the STA refers to a non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

An AP is an entity that provides access to a Distribution System (DS) to a STA associated with the AP through a wireless medium. The AP may also be referred to as a centralized controller, a Base Station (BS), a Node-B, a Base Transceiver System (BTS), or a site controller.

BSSs may be classified into infrastructure BSS and Independent BSS (IBSS).

The BSSs illustrated in FIG. 1 are IBSSs. An IBSS refers to a BSS that does not include an AP. Since the IBSS does not include an AP, the IBSS is not allowed to access to the DS and thus forms a self-contained network.

Figure 2:
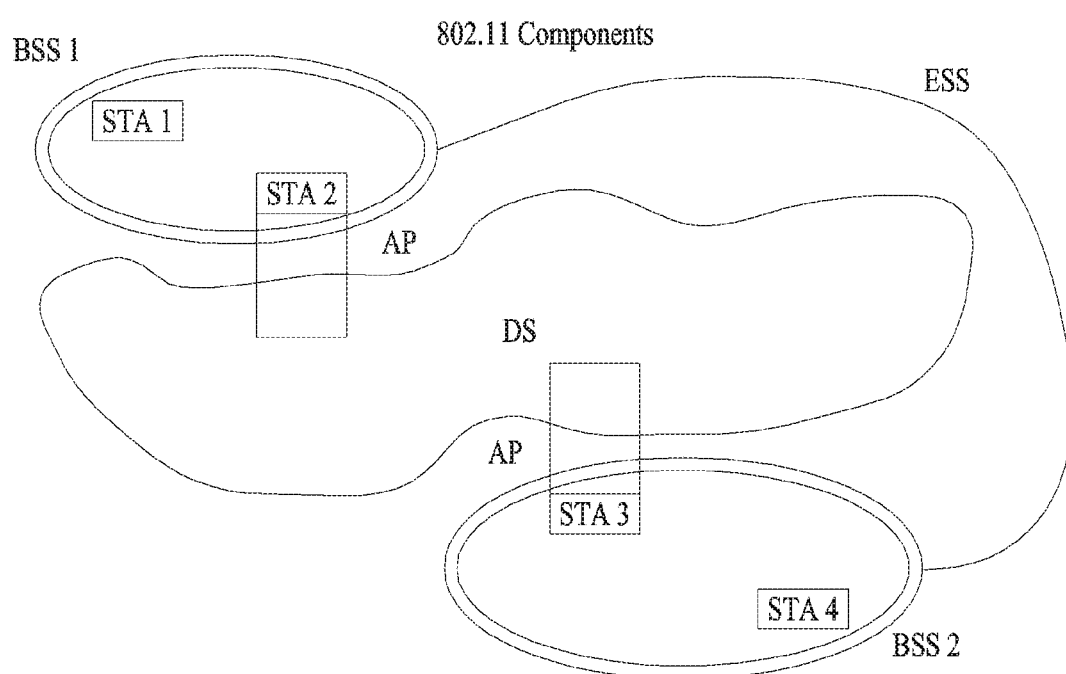
FIG. 2 is a view illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication is also possible between the non-AP STAs.

As illustrated in FIG. 2, a plurality of infrastructure BSSs may be interconnected via a DS. The BSSs interconnected via the DS are called an Extended Service Set (ESS). STAs included in the ESS may communicate with each other, and a non-AP STA within the same ESS may move from one BSS to another BSS while seamlessly performing communication.

The DS is a mechanism that connects a plurality of APs to one another. The DS is not necessarily a network. As long as it provides a specific distribution service, the DS is not limited to any specific form. For example, the DS may be a wireless network such as a mesh network or may be a physical structure that connects APs to one another.

Now, a description will be given of a Block ACK mechanism in a WLAN system based on the above description.

The Block ACK mechanism is a scheme of transmitting a plurality of ACK/NACK signals in one frame, thereby increasing channel efficiency. For the Block ACK mechanism, two response schemes are available: immediate response and delayed response. The immediate response scheme may be favorable for transmission of traffic with a short latency in a wide bandwidth, whereas the delayed response scheme may be suitable for a delay-tolerant application. Unless otherwise specified in the following description, a STA transmitting data in the Block ACK mechanism is referred to as an originator, and a STA receiving the data is referred to as a recipient.

Figure 3:
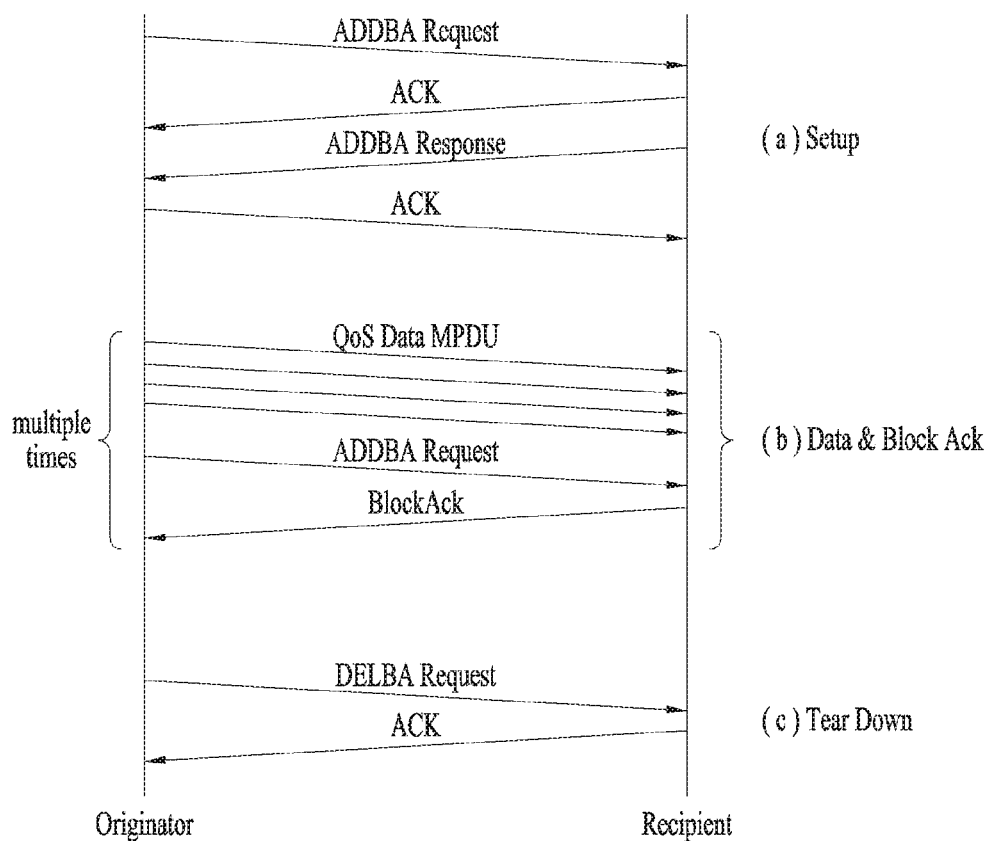
FIG. 3 is a view illustrating a Block Acknowledgment (ACK) mechanism used in a WLAN system.

FIG. 3 is a view illustrating a Block ACK mechanism in a WLAN system.

As illustrated in FIG. 3, the Block ACK mechanism may be initiated by exchange between an Add Block Acknowledgement (ADDBA) request frame and an ADDBA response frame ((a) Setup). After the Block ACK mechanism is initiated in this manner, an originator may transmit Quality of Service (QoS) data frame blocks to a recipient. As the originator wins a polled Transmit Opportunity (TXOP) or an Enhanced Distributed Channel Access (EDCA) contention, transmission of these blocks may be started. The number of frames in a block may be limited. Reception or non-reception of MAC Protocol Data Units (MPDUs) included in such a frame block may be confirmed from a Block ACK frame received in response to a request made by a BlockAckReq frame ((b) Data & Block ACK).

If the originator does not have any more transmission data and a final Block ACK exchange is completed, the originator may end the Block ACK mechanism by transmitting a Delete Block Acknowledgement (DELBA) frame to the recipient. Upon receipt of the DELBA frame, the recipient may release all resources allocated for Block ACK transmission ((c) Tear Down).

Figure 4:
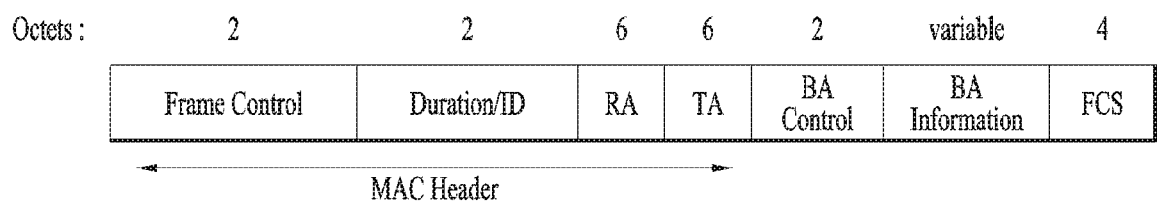
FIG. 4 is a view illustrating a basic configuration of a Block ACK frame.

FIG. 4 is a view illustrating a basic configuration of a Block ACK (BA) frame.

As illustrated in FIG. 4, the BA frame may include a MAC Header field, a BA Control field, and a BA Information field. The MAC Header field may include a Frame Control field, a Duration/ID field, an RA field, and a TA field. Herein, the RA field represents an address of a receiving STA and the TA field represents an address of an originating STA.

Figure 5:
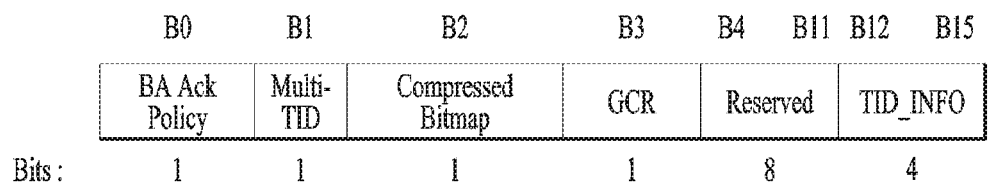
FIG. 5 is a view illustrating a detailed configuration of a BA Control field illustrated in FIG. 4.

FIG. 5 is a view illustrating a detailed configuration of the BA Control field illustrated in FIG. 4.

The values of a BA Ack Policy subfield in the BA Control field may have the meanings described in [Table 1] below.

TABLE 1

| Value | Meaning |
|---|---|
| 0 | Normal Acknowledgment<br>The BA Ack Policy subfield is set to this value when the sender |

TABLE 1-continued

| Value | Meaning |
|---|---|
|  | requires immediate acknowledgment.<br>The addressee returns an Ack frame.<br>The value 0 is not used for data sent under HT-delayed Block Ack during a PSMP sequence.<br>The value 0 is not used in frames transmitted by DMG STAs. |
| 1 | No Acknowledgment.<br>The addressee sends no immediate response upon receipt of the frame.<br>The BA Ack Policy is set to this value when the sender does not require immediate acknowledgment.<br>The value 1 is not used in a Basic BlockAck frame outside a PSMP sequence.<br>The value 1 is not used in an Multi-TID BlockAck frame. |

Meanwhile, Multi-Traffic Identifier (Multi-TID), Compressed Bitmap, and GCR subfields in the BA Control field may determine possible BlockAck frame variants according to the following regulation.

TABLE 2

| Multi-TID subfield value | Compressed Bitmap subfield value | GCR subfield value | BlockAck frame variant |
|---|---|---|---|
| 0 | 0 | 0 | Basic BlockAck |
| 0 | 1 | 0 | Compressed BlockAck |
| 1 | 0 | 0 | Extended Compressed BlockAck |
| 1 | 1 | 0 | Multi-TID BlockAck |
| 0 | 0 | 1 | Reserved |
| 0 | 1 | 1 | GCR BlockAck |
| 1 | 0 | 1 | Reserved |
| 1 | 1 | 1 | Reserved |

Figure 6:
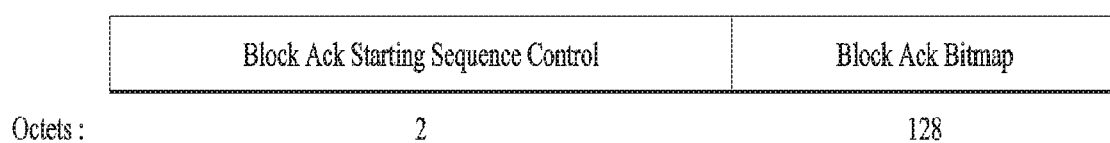
FIG. 6 is a view illustrating a detailed configuration of a Block ACK (BA) Information field illustrated in FIG. 4.
Figure 7:
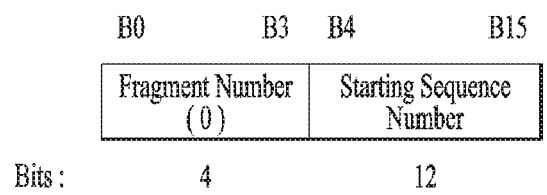
FIG. 7 is a view illustrating a configuration of a Block Ack Starting Sequence Control subfield.

FIG. 6 is a view illustrating a detailed configuration of the BA Information field illustrated in FIG. 4, and FIG. 7 is a view illustrating a configuration of a Block Ack Starting Sequence Control subfield.

As illustrated in FIG. 6, the BA Information field may include a Block Ack Starting Sequence Control (SSC) subfield and a Block Ack Bitmap subfield.

As illustrated in FIG. 6, the Block Ack Bitmap subfield is 128 octets in length, and thus may represent the reception statuses of 64 MAC Service Data Units (MSDUs). If bit position n in the Block Ack Bitmap subfield is set to 1, this may indicate that an MPDU having an MPDU sequence control value corresponding to (SSC+n) has been successfully received. Herein, SSC represents the value of the Block Ack Starting Sequence Control subfield. On the other hand, if bit position n of the Block Ack Bitmap field is set to 0, this may indicate that the MPDU having the MPDU sequence control value corresponding to (SSC+n) has not been received. Each of the values of an MPDU Sequence Control field and the Block Ack Starting Sequence Control subfield may be treated as a 16-bit unsigned integer. For unused fragment numbers of an MSDU, corresponding bits in the bitmap may be set to 0.

Figure 8:
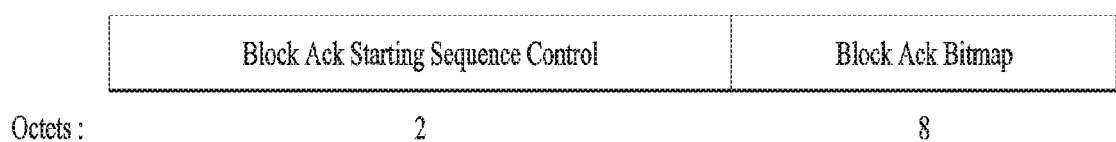
FIG. 8 is a view illustrating a configuration of a BA Information field of a compressed Block ACK frame.

FIG. 8 is a view illustrating a configuration of a BA Information field in a compressed Block ACK frame.

As illustrated in FIG. 8, a Block Ack Bitmap subfield of the BA Information field of the compressed Block ACK frame may be 8 octets in length and indicate the reception statuses of 64 MSDUs and Aggregate MSDUs (A-MSDUs). The first bit of the bitmap corresponds to an MSDU or A-MSDU matching a value of a Block Ack Starting Sequence Control subfield, and each bit of the bitmap may sequentially correspond to an MSDU or A-MSDU following the above MSDU or A-MSDU.

Figure 9:
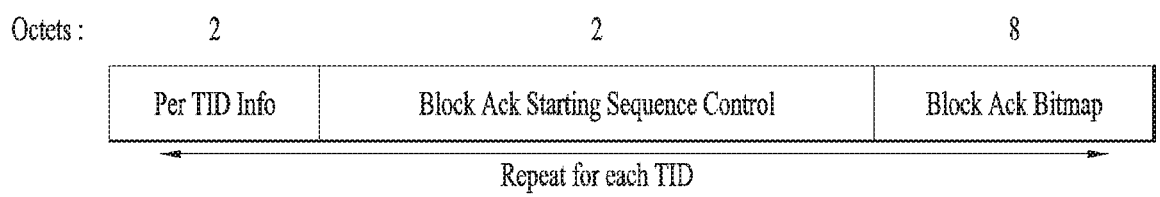
FIG. 9 is a view illustrating a BA Information field of a Multi-Traffic Identifier (TID) Block ACK frame.

FIG. 9 is a view illustrating a BA Information field in a Multi-TID Block ACK frame.

A TID_INFO subfield of a BA Information field in the Multi-TID Block ACK frame contains information about the number of TIDs in the BA Information field. Specifically, a value of the TID_INFO subfield represents (the number of TIDs corresponding to information of the BA Information field)−1. For example, if the value of the TID_INFO subfield is 2, this may indicate that the BA Information field contains information about three TIDs.

Meanwhile, the Multi-TID Block ACK frame may include a Per TID Info subfield in addition to a Block Ack Starting Sequence Control subfield and a Block Ack Bitmap subfield as illustrated in FIG. 9. The first Per TID Info, Block Ack Starting Sequence Control, and Block Ack Bitmap subfields may be transmitted in correspondence to a lowest TID value, and subsequent repeated subfields may correspond to the next TID. A triplet of these subfields may be repeated per TID.

Figure 10:
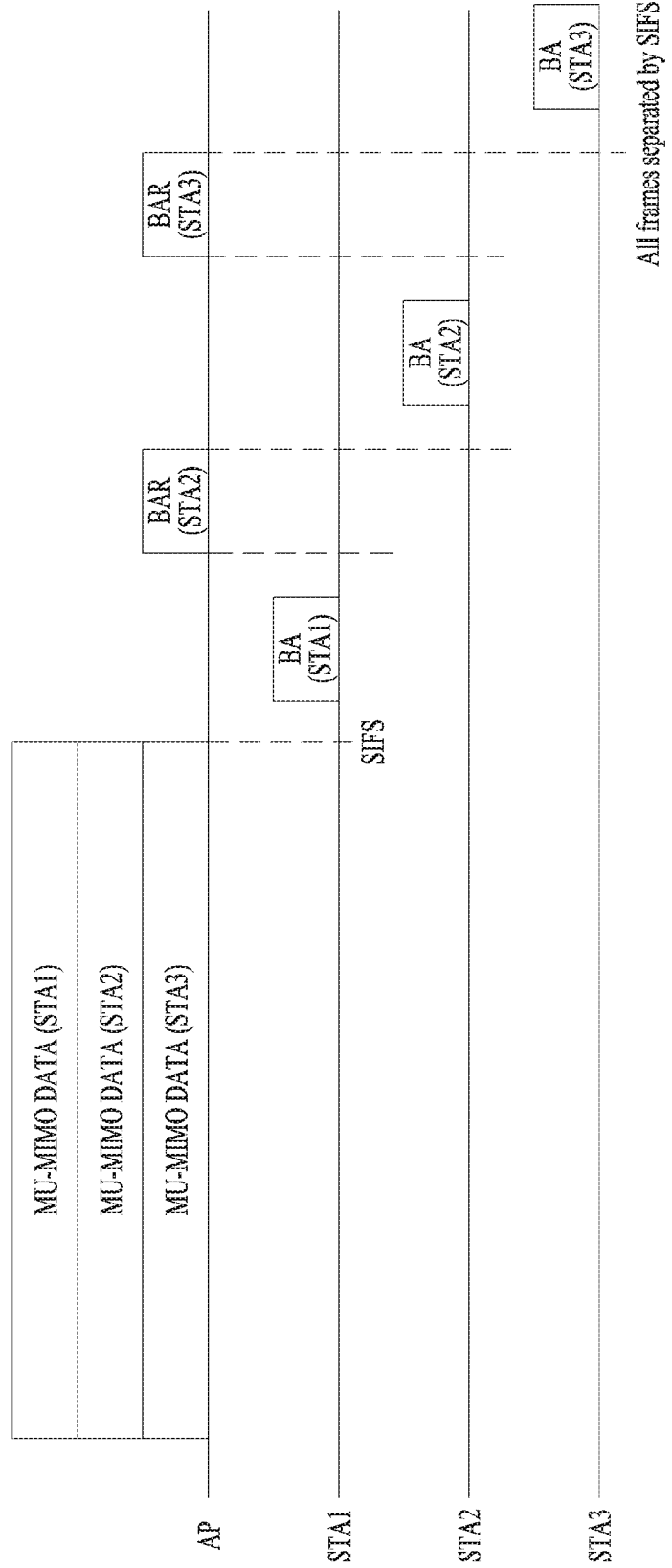
FIGS. 10 and 11 are views illustrating cases in which a Block ACK mechanism is applied to Downlink (DL) Multi-User Multiple Input Multiple Output (MU-MIMO).
Figure 11:
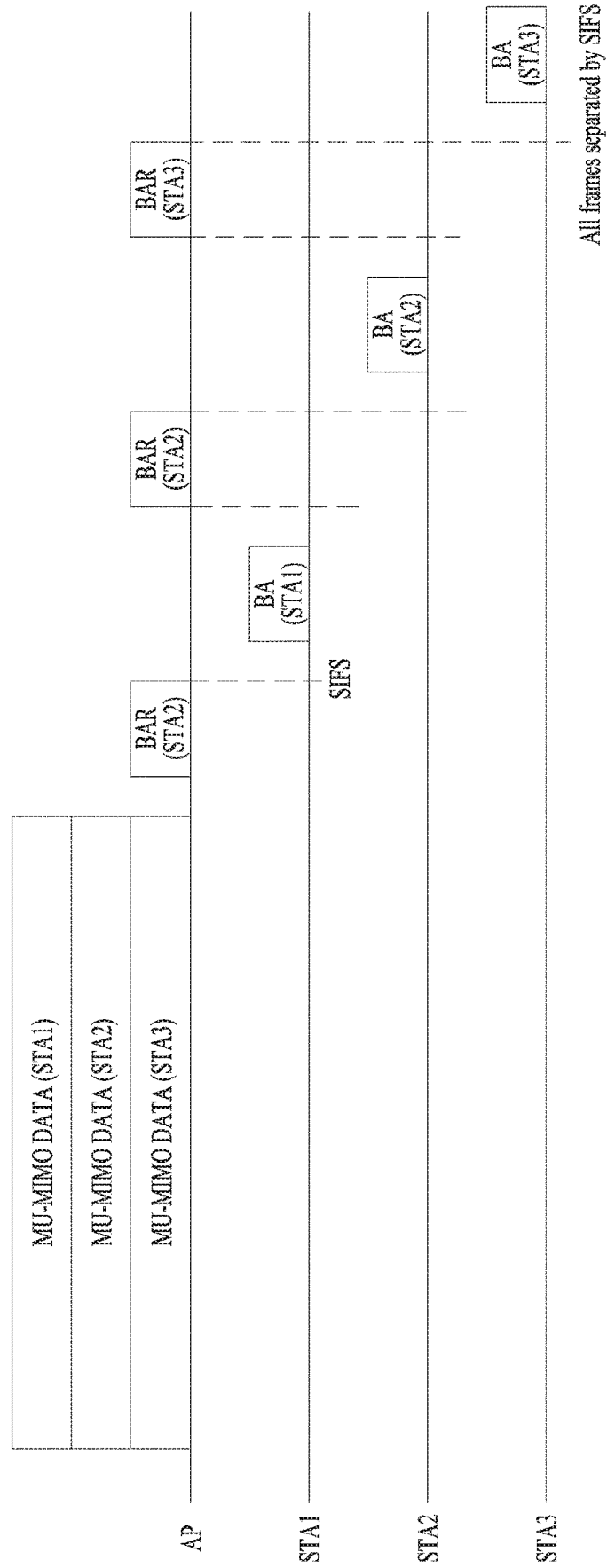

FIGS. 10 and 11 are views illustrating cases in which the Block ACK mechanism is applied to DL MU-MIMO.

As illustrated in FIGS. 10 and 11, an AP may transmit an MU-MIMO data frame to a plurality of STAs (STA1, STA2, and STA3).

In FIG. 10, it is assumed that frames are exchanged a Short Inter-Frame Space (SIFS) after transmission of a Multi-User PLCP Protocol Data Unit (MU PPDU). It is assumed in FIG. 10 that Implicit Block ACK Request is set as an ACK policy for STA1, and Block ACK is set as an ACK policy for STA2 and STA3. Therefore, STA1 may receive a BA frame immediately after receiving the DL MU PPDU without a BA request. On the other hand, the AP may perform polling for STA2 and STA3 by transmitting BA Request (BAR) frames to STA2 and STA3. STA2 and STA3 may transmit BA frames in response to the BAR frames.

Meanwhile, FIG. 11 illustrates an example in which frames are exchanged without an SIFS after transmission of an MU PPDU. It is assumed in FIG. 11 that Block ACK is set as an ACK policy for all STAs. Therefore, the AP may perform polling by transmitting a BAR frame to every STA.

Figure 12:
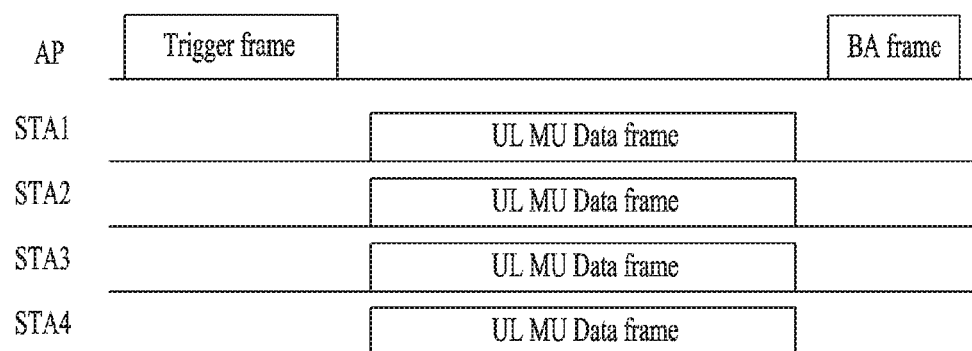
FIG. 12 is a view illustrating an Uplink (UL) MU transmission situation to which the present disclosure is applied.

FIG. 12 is a view illustrating a UL MU transmission situation to which the present disclosure is applied.

As described above, UL MU transmission may be used in the 802.11ax system. As illustrated in FIG. 12, as an AP transmits a trigger frame to a plurality of STAs (e.g., STA1 to STA4), UL MU transmission may be started. The trigger frame may include UL MU allocation information (e.g., resource positions and sizes, STA IDs, a Modulation and Coding Scheme (MCS), an MU type (MIMO, OFDMA, or the like)). Specifically, for example, the following information may be transmitted in the trigger frame.

TABLE 3

Duration, Number of allocations (N), each allocation's information, and SU/MU AID (as many as the number of STAs in the case of MU). Power adjustment, Tone(/Resource) allocation information (e.g., bitmap), MCS, Nsts, STBC, Coding, Beamformed, etc.

Meanwhile, as illustrated in FIG. 12, the AP may acquire a TXOP in which to transmit a trigger frame by contention for medium access. Then, the STAs may transmit UL data frames in a format indicated by the AP, an SIFS after the trigger frame. In the present disclosure, it is assumed that the AP performs an ACK/NACK procedure for the UL MU data frames by a Block ACK (BA) frame.

In UL multiple access, flexible application of an ACK policy value per STA may be considered in order to render an ACK/NACK signal transmission scheme of an AP to be flexible.

A QoS Control field of a UL MU frame has the following configuration. Particularly, the QoS Control field has a 2-bit field indicating an ACK policy in bits 5 and 6.

TABLE 4

| Applicable frame (sub) types | Bits 0-3 | Bit 4 | Bits 5-6 | Bit 7 | Bits 8 Bit 9 Bit 10 | Bits 11-15 |
|---|---|---|---|---|---|---|
| Qos CF-Poll and QoS CF-Ack + CF-Poll frames sent by HC | TID | EOSP | Ack Policy | Reserved | | TXOP Limit |
| QoS Data + CF-Poll and QoS data + CF-Ack + CF-Poll Frames sent by HC | TID | EOSP | Ack Policy | A-MSDU Present | | TXOP Limit |
| QoS Data and QoS Data + CF-Ack frames sent by HC | TID | EOSP | Ack Policy | A-MSDU Present | | AP PS Buffer State |
| QoS Null frames sent by HC | TID | EOSP | Ack Policy | Reserved | | AP PS Buffer State |
| QoS Data and QoS Data + CF-Ack frames sent by non-AP STAs that are not a TPU buffer STA or a TPU sleep STA in a nonmesh BSS | TID | 0 | Ack Policy | A-MSDU Present | | TXOP Duration Requested |
| | TID | 1 | Ack Policy | A-MSDU Present | | Queue Size |
| QoS Null frames sent by non-AP STAs that are not a TPU buffer STA or a TPU sleep STA in a nonmesh BSS | TID | 0 | Ack Policy | Reserved | | TXOP Duration Requested |
| | TID | 1 | Ack Policy | Reserved | | Queue Size |

TABLE 5

| Applicable frame (sub) types | Bits 0-3 | Bit 4 | Bits 5-6 | Bit 7 | Bits 8 | Bit 9 | Bit 10 | Bits 11-15 |
|---|---|---|---|---|---|---|---|---|
| QoS Data and QoS Data + CF-Ack frames sent by TPU buffer STAs in a nonmesh BSS | TID | EOSP | Ack Policy | A-MSDU Present | | Reserved | | |
| QoS Null frames sent by TPU buffer STAs in a nonmesh BSS | TID | EOSP | Ack Policy | Reserved | | Reserved | | |
| QoS Data and QoS Data + CF-Ack frames sent by TPU sleep STAs in a nonmesh BSS | TID | Reserved | Ack Policy | A-MSDU Present | | Reserved | | |
| QoS Null frames sent by TPU sleep STAs in a nonmesh BSS | TID | Reserved | Ack Policy | Reserved | | Reserved | | |
| All frames sent by mesh STAs in a mesh BSS | TID | EOSP | Ack Policy | A-MSDU Present | Mesh Control Present | Mesh Power Save Level | RSPI | Reserved |

The values of the Ack Policy field illustrated in [Table 4] and [Table 5] are set as follows.

TABLE 6

Ack Policy ==00

Normal Ack or Implicit Block Ack Request.
In a frame that is a non-A-MPDU frame or VHT single MPDU:
The addressed recipient returns an Ack or QoS +CF-Ack frame after a short interframe space
(SIFS) period, according to the procedures defined in Ack procedure and HCCA transfer
rules. A non-DMG STA sets the Ack Policy subfield for individually addressed QoS Null (no
data) frames to this value.
Otherwise:
The addressed recipient returns a BlockAck frame, either individually or as part of an A-
MPDU starting a SIFS after the PPDU carrying the frame, according to the
procedures defined in Block ack procedure, Generation and transmission of BlockAck frames
by an HT STA or DMG STA, Operation of HT-delayed block ack, Rules for RD initiator,
Rules for RD responder, and Explicit feedback beamforming.

TABLE 7

Ack Policy ==10

No Ack
The addressed recipient takes no action upon receipt of the frame.
The Ack Policy subfield is set to this value in all individually addressed
frames in which the sender does not require acknowledgment. The Ack
Policy subfield is also set to this value in all group addressed frames
that use the QoS frame format except with a TID for which a block
ack agreement exists.
This value of the Ack Policy subfield is not used for QoS Data frames
with a TID for which a block ack agreement exists.
The Ack Policy subfield for group addressed QoS Null (no data) frames is
set to this value.

TABLE 8

Ack Policy ==01

No explicit acknowledgment or PSMP Ack or MU Ack.
When bit 6 of the Frame Control field (see 9.2.4.1.3 (Type and Subtype subfields)) is set to 1:
There might be a response frame to the frame that is received, but it is neither the Ack frame nor any Data frame of subtype +CF-Ack.
The Ack Policy subfield for QoS CF-Poll and QoS CF-Ack +CF-Poll Data frames is set to this value.
When bit 6 of the Frame Control field (see 9.2.4.1.3 (Type and Subtype subfields)) is set to 0:
The acknowledgment for a frame indicating PSMP Ack when it appears in a PSMP downlink transmission time (PSMP-DTT) is to be received in a later PSMP uplink transmission time (PSMP-UTT).
The acknowledgment for a frame indicating PSMP Ack when it appears in a PSMPUTT is to be received in a later PSMP-DTT.
For a frame that is carried in a DL HE MU PPDU:
The Ack Policy subfield for the frame that solicits an immediate response in a HE Trigger-based PPDU is set to this value (MU Ack).
The addressed recipient returns an Ack, BlockAck, or Multi-STA BlockAck frame in the HE trigger-based PPDU format after a SIFS period, according to the procedures defined in 10.3.2.11.2 (Acknowledgement procedure for HE MU PPDU in MU format) and 25.5.2 (UL MU operation). (#2445)
NOTE - Bit 6 of the Frame Control field (see 9.2.4.1.3 (Type and Subtype subfields)) indicates the absence of a data Frame Body field. When equal to 1, the QoS Data frame contains no Frame Body field, and any response is generated in response to a QoS CF-Poll or QoS CF-Ack +CF-Poll frame, but does not signify an acknowledgment of data. When set to 0, the QoS Data frame contains a Frame Body field, which is acknowledged as described in 10.29.2.7 (PSMP acknowledgment rules).

TABLE 9

Ack Policy ==11

Block Ack
The addressed recipient takes no action upon the receipt of the frame except for recording the state. The recipient can expect a BlockAckReq frame in the future to which it responds using the procedure described in Block acknowledgment (block ack).

That is, the above-described Ack Policy field may represent four different values by 2-bit information, and each of the values of the Ack Policy field is defined in [Table 6] to [Table 9]. In the following description, a method for transmitting ACK/NACK signals to a plurality of STAs more flexibly by an AP through application of the Ack Policy field to a UL MU situation. ACK policy values used in the following description may have additional meanings as set forth below in addition to the meanings described in [Table 6] to [Table 9]. However, unless otherwise specified, it is assumed that the ACK policy values are pursuant to the definitions in [Table 6] to [Table 9].

Figure 13:
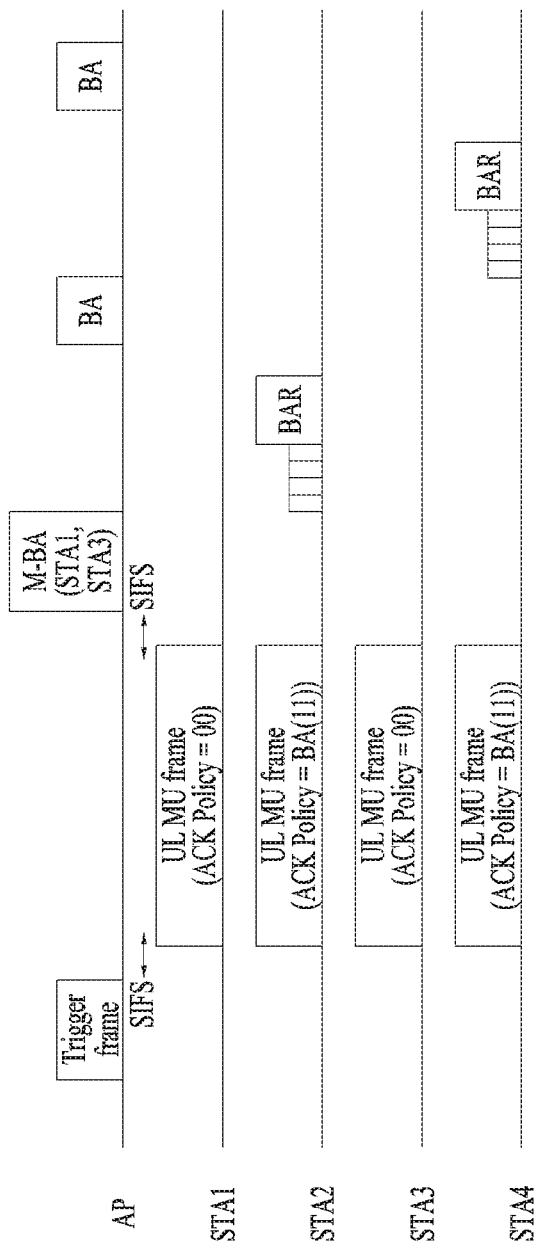
FIG. 13 is a view illustrating a method for transmitting ACK/NACK signals to a plurality of STAs, using an ACK policy according to an embodiment of the present disclosure.

FIG. 13 is a view illustrating a method for transmitting ACK/NACK signals to a plurality of STAs, using an ACK policy according to an embodiment of the present disclosure.

As in the example of FIG. 13, the AP may trigger transmission of UL MU frames by transmitting a trigger frame to STA1 to STA4. Accordingly, when transmitting the UL MU frames, STA1 to STA4 may include Ack Policies in MPDUs. In FIG. 13, it is assume that STA1 and STA3 set Ack Policy values to 00 and STA2 and STA4 set Ack Policy values to 11.

It is assumed in this embodiment that if the Ack Policy value of a UL MU frame is 00, this indicates an implicit BA/ACK request for a single MPDU, and the AP may simultaneously transmit a BA (i.e., an M-BA) to STAs that have transmitted UL MU frames with Ack Policy=00 (implicit BA/ACK), immediately an SIFS after receiving the UL MU frames from the STAs. The M-BA is assumed to include ACKs/BAs for the plurality of STAs. That is, upon receipt of one or more UL MU frames with Ack Policy=00, the AP transmits an M-BA an SIFS later. Then, after receiving BARs from STAs that have transmitted UL MU frames with Ack Policy set to 11 indicating BA, the AP may transmit a Block ACK to the STAs that have transmitted the BARs.

In FIG. 13, since Ack Policies of STA1 and STA3 are 00 (implicit BA or ACK for single MPDU), the AP transmits a BAs/ACKs (i.e., an M-BA) to STA1 and STA3 at one time, an SIFS after reception of UL MU frames. Herein, the AP may transmit a Block ACK (multi-STA BA) including BA/ACK information for multiple STAs.

Subsequently, the AP may await receipt of BARs from STA2 and STA4 that have transmitted UL frames with Ack Policy set to 11 indicating BA. Then, STA2 may transmit a BAR in a contention-based manner, and the AP may transmit a BA to STA2 in response to the BAR. Subsequently, STA4 may transmit a BAR in a contention-based manner, and the AP may transmit a BA to STA4 in response to the BAR.

However, if ACK policy values are flexibly used for each of a plurality of STAs as in FIG. 13, the UL MU operation may become complex. Particularly when a STA uses Ack Policy set to '11', the AP should transmit an ACK after awaiting receipt of a BAR from the STA, the procedure may be delayed.

Accordingly, a preferred embodiment of the present disclosure proposes that an ACK policy value of '11' is not used in a UL MU situation. Thus, it is assumed that a STA transmits data in UL MU and sets an ACK policy value to a value other than '11' (e.g., '00', '01', or '10'). Therefore, when requesting an ACK/NACK, the STA preferably operates by setting Ack Policy to '00'.

The above UL MU situation may be different from the afore-described DL MU situation. In DL MU, since an AP may uniformly determine ACK policy values for a plurality of STAs, the AP may select a BAR-based ACK policy for some STA according to the situation of the AP.

Figure 14:
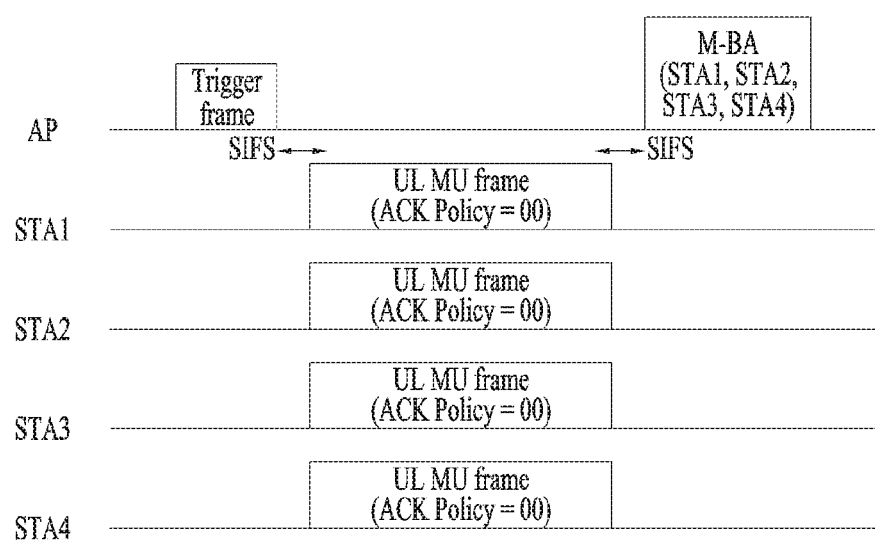
FIG. 14 is a view illustrating a case in which a Block ACK Request (BAR)-based ACK policy value is not used according to an embodiment of the present disclosure.

FIG. 14 is a view illustrating a case in which a BAR-based ACK policy value is not used according to an embodiment of the present disclosure.

As described in FIG. 14, an AP may trigger transmission of UL MU frames from a plurality of STAs by transmitting a trigger frame. Thus, it is assumed that each of STA1 to STA4 transmits a UL MU frame, requesting reception of an ACK/NACK for the UL MU frame in the example of FIG. 14. Accordingly, STA1 to STA4 transmit UL MU frames with Ack Policy set to '00', and thus receive ACK/NACK signals after an SIFS from the AP.

Meanwhile, the AP is shown in FIG. 14 as transmitting ACK/NACK signals in an M-BA, by way of example. Thus, the AP may transmit all of ACK/NACK signals for STA1 to STA4 in the M-BA.

Figure 15:
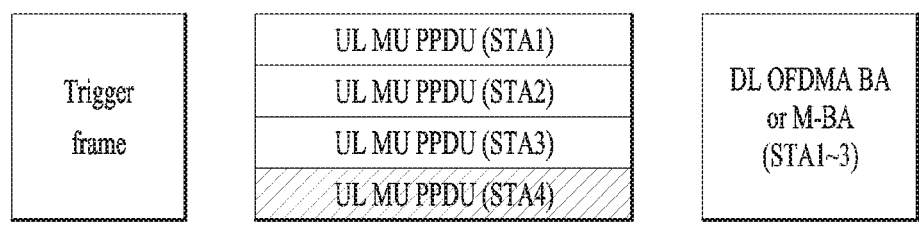
FIGS. 15 and 16 are views additionally illustrating a UL multiple access situation to which the present disclosure is applied.
Figure 16:
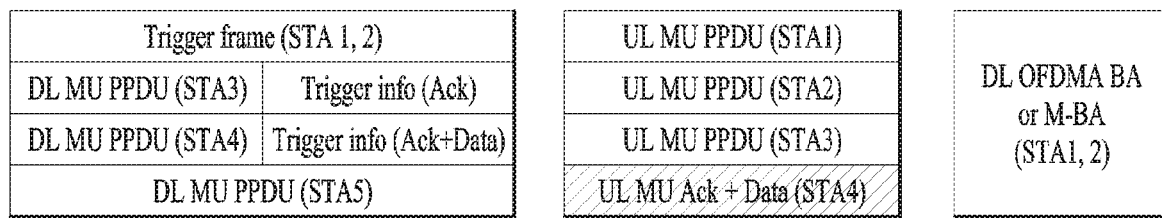

FIGS. 15 and 16 are views additionally illustrating a UL multiple access situation to which the present disclosure is applied.

FIG. 15 is a view illustrating a situation in which STA1 to STA4 transmit UL MU PPDUs in response to a trigger frame transmitted by an AP, as described above. In FIG. 15, since STA1, STA2, and STA3 request ACK/NACK signals for their transmitted UL MU PPDUs, STA1, STA2, and STA3 preferably transmit the UL MU PPDUs with Ack Policy set to '00'. In contrast, STA4 does not request an ACK/NACK signal for its transmitted UL MU PPDU, and thus may transmit the UL MU PPDU with Ack Policy set to '01'.

Therefore, the AP may transmit ACK/NACK signals in a DL OFDMA BA or M-BA to STA1, STA2, and STA3 that have set Ack Policy to '00'.

Meanwhile, as illustrated in FIG. 16, the AP may transmit a DL MU PPDU together with a trigger frame. Thus, after the STAs transmit UL MU PPDUs or UL ACKs, the AP may transmit a DL ACK for a UL MU PPDU for which an ACK is needed. Herein, trigger information for transmission of an ACK for a DL MU PPDU may be included or may be implicitly derived.

A DL ACK frame may be transmitted in an OFDMA or M-BA form. That is, each piece of ACK information transmitted to each STA may be configured in an OFDMA frame or ACK information transmitted to all STAs may be aggregated in one frame. A hybrid scheme of the two schemes is also possible, in which an M-BA is used only within 20 MHz, and OFDMA is used in a bandwidth equal to or larger than 20 MHz.

If compared to a DL MU situation, different ACK policy values are set for different STAs in a UL MU situation as described above, the procedure may become complex and an unnecessary delay may occur. Therefore, it is preferred not to use an ACK policy value of '11'.

However, to solve the problem of selecting a different ACK policy value for each STA in a UL MU situation as described above and flexibly use an ACK policy according to the state of each STA, another embodiment of the present disclosure proposes that an AP sets a per-STA ACK policy by a trigger frame.

Figure 17:
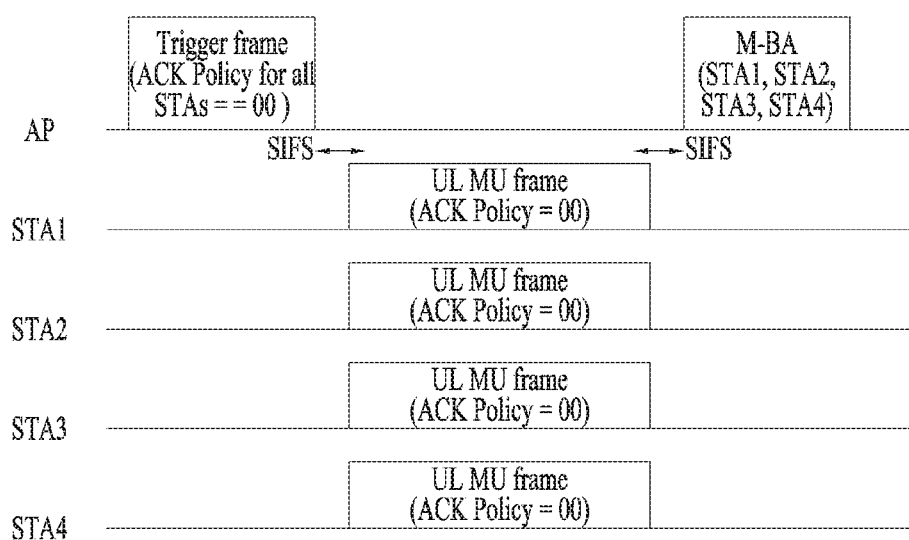
FIGS. 17 and 18 are views illustrating ACK policy values in a trigger frame transmitted by an Access Point (AP).
Figure 18:
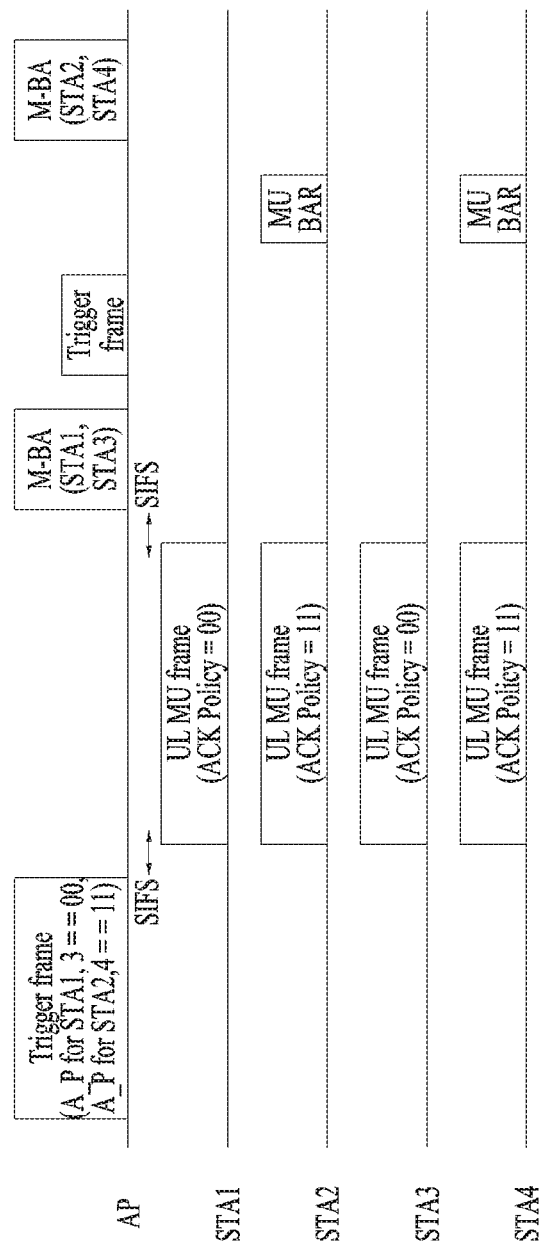

FIGS. 17 and 18 are views illustrating ACK policy values in a trigger frame transmitted by an AP.

The AP may set the same or different ACK policies for all STAs in a trigger frame. FIG. 17 illustrates an example of setting the same Ack Policy==00 (implicit BA) for all STAs, and FIG. 18 illustrates an example of setting an ACK Policy on a STA basis.

In the example of FIG. 18, Ack Policy (A_P) is set to 00 (implicit BA/ACK for single MPDU) for STA1 and STA3, and A_P is set to 11 (Block ACK) for STA2 and STA4. Therefore, the AP may receive UL MU frames, transmit BAs/ACKs for STA1 and STA3 in an M-BA, and then allocate resources for MU BAR transmission to STA2 and STA4 by a trigger frame.

Figure 19:
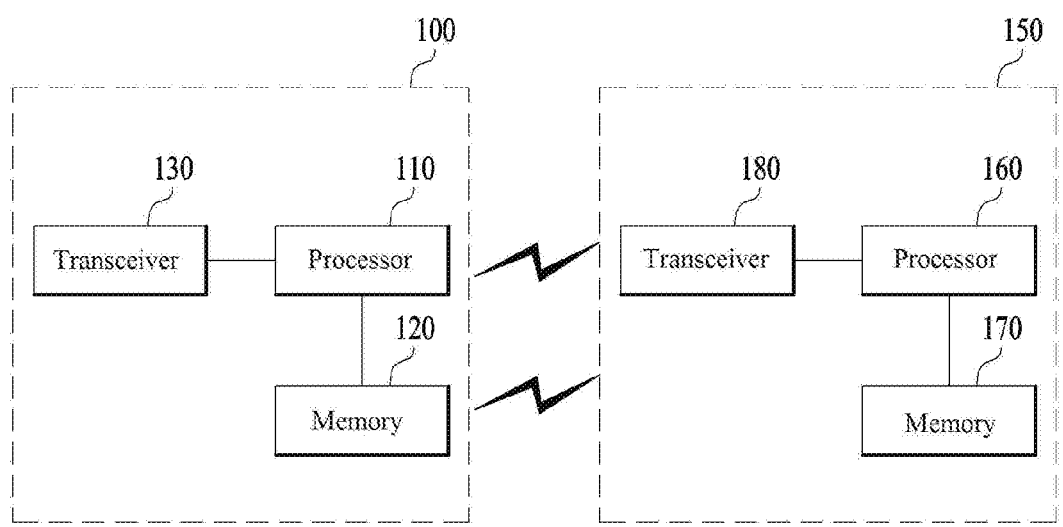
FIG. 19 is a block diagram of apparatuses for implementing the above methods.

FIG. 19 is a block diagram of apparatuses for implementing the above-described methods.

A wireless apparatus 800 of FIG. 19 may correspond to the above-described specific STA, and a wireless apparatus 850 of FIG. 19 may correspond to the above-described AP.

The STA 800 may include a processor 810, a memory 820, and a transceiver 830, and the AP 850 may include a processor 860, a memory 870, and a transceiver 880. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880. The processors 810 and 860 may perform the above-described UL MU scheduling procedure.

The processors 810 and 860 and/or the transceivers 830 and 880 may include an Application-Specific Integrated Circuit (ASIC), other chipsets, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described methods may be executed in the form of a module (e.g., a process or a function) performing the above-described functions. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred embodiments of the present disclosure has been given to enable those skilled in the art to implement and practice the present disclosure. Although the present disclosure has been described with reference to the preferred embodiments, those skilled in the art will appreciate that various modifications and variations can be made in the present disclosure without departing from the spirit or scope of the present disclosure described in the appended claims. Accordingly, the present disclosure should not be limited to the specific embodiments described herein, but should be accorded the broadest scope consistent with the principles and novel features disclosed herein.

INDUSTRIAL APPLICABILITY

While the present disclosure has been described in the context of an IEEE 802.11 WLAN system, the present disclosure is not limited thereto. The present disclosure is applicable in the same manner to various wireless systems in which an AP is capable of performing a Block ACK mechanism for a plurality of STAs.

What is claimed is:

1. A method for accessing an access point (AP) in an uplink multi-user transmission scheme by a station (STA) in a wireless local area network (WLAN) system, the method comprising:

receiving a trigger frame from the AP;

based on receiving the trigger frame, setting two bits of an uplink Physical layer Protocol Data Unit (PPDU) to an acknowledgement (ACK) policy value, wherein the two bits are arranged in an ACK policy subfield in a Quality of Service (QoS) control field of the uplink PPDU; and transmitting the uplink PPDU to the AP in the uplink multi-user transmission scheme, wherein the ACK policy value for the uplink PPDU is selected, by the STA, from among a first set of allowable ACK policy values for the uplink multi-user transmission scheme, wherein the first set of allowable ACK policy values comprises a first ACK policy value representing a 'normal ACK' or 'an implicit block ACK request,' and a second ACK policy value representing a 'no ACK', wherein the first set of allowable ACK policy values excludes a third ACK policy value representing 'Block ACK', wherein based on a downlink PPDU being received in a downlink multi-user transmission scheme from the AP, the ACK policy value for the downlink PPDU is selected, by the AP, from a second set of allowable ACK policy values for the downlink multi-user transmission scheme, wherein the second set of allowable ACK policy values comprises the first ACK policy value, the second ACK policy value, and the third ACK policy value, and wherein a use of the first set of allowable ACK policy values and the second set of allowable ACK policy values is based on whether the uplink multi-user transmission scheme is used or the downlink multi-user transmission scheme is used.

2. The method according to claim 1, wherein the STA sets the ACK policy value for the uplink PPDU transmitted based on the trigger frame to the first ACK policy value.

3. The method according to claim 2, further comprising, after transmission of the uplink PPDU with the ACK policy value set to the first ACK policy value, receiving an ACK/NACK signal for the uplink PPDU from the AP.

4. The method according to claim 3, wherein the ACK/NACK signal is received a short inter-frame space (SIFS) after the transmission of the uplink PPDU with the ACK policy value set to the first ACK policy value.

5. A station (STA) configured to access an access point (AP) in an uplink multi-user transmission scheme in a wireless local area network (WLAN) system, the STA comprising:
   at least one transceiver;
   at least one processor; and
   at least one computer memory operably connected to the processor and storing instructions that, based on being executed by the at least one processor, perform operations comprising:
   receiving, via the at least one transceiver, a trigger frame from the AP;
   based on receiving the trigger frame, setting two bits of an uplink Physical layer Protocol Data Unit (PPDU) to an acknowledgement (ACK) policy value, wherein the two bits are arranged in an ACK policy subfield in a Quality of Service (QoS) control field of the uplink PPDU; and
   transmitting, via the at least one transceiver, the uplink PPDU to the AP in the uplink multi-user transmission scheme,
   wherein the ACK policy value for the uplink PPDU is selected, by the STA, from among a first set of allowable ACK policy values for the uplink multi-user transmission scheme,
   wherein the first set of allowable ACK policy values comprises a first ACK policy value representing a 'normal ACK' or 'an implicit block ACK request,' and a second ACK policy value representing a 'no ACK',
   wherein the first set of allowable ACK policy values excludes a third ACK policy value representing 'Block ACK',
   wherein based on a downlink PPDU being received in a downlink multi-user transmission scheme from the AP, the ACK policy value for the downlink PPDU received from the AP is from among, from a second set of allowable ACK policy values for the downlink multi-user transmission scheme, wherein the second set of allowable ACK policy values comprises the first ACK policy value, the second ACK policy value, and the third ACK policy value, and
   wherein a use of the first set of allowable ACK policy values and the second set of allowable ACK policy values is based on whether the uplink multi-user transmission scheme is used or the downlink multi-user transmission scheme is used.

6. The STA according to claim 5, wherein the operations further comprise: setting the ACK policy value for the uplink PPDU transmitted based on the trigger frame to the first ACK policy value.

7. A method for receiving uplink Physical layer Protocol Data Units (PPDUs) from a plurality of stations (STAs) in an uplink multi-user transmission scheme by an access point (AP) in a wireless local area network (WLAN) system, the method comprising:
   transmitting a trigger frame to the plurality of STAs; and
   receiving an uplink PPDU from the plurality of STAs in the uplink multi-user transmission scheme,
   wherein two bits of the uplink PPDU are set to an acknowledgement (ACK) policy value, wherein the two bits are arranged in an ACK policy subfield in a Quality of Service (QoS) control field of the uplink PPDU,
   wherein the ACK policy value for the uplink PPDU is selected, by the plurality of STAs, from among a first set of allowable ACK policy values for the uplink multi-user transmission scheme,
   wherein the first set of allowable ACK policy values comprises a first ACK policy value representing a 'normal ACK' or 'an implicit block ACK request,' and a second ACK policy value representing a 'no ACK',
   wherein the first set of allowable ACK policy values excludes a third ACK policy value representing 'Block ACK',
   wherein based on a downlink PPDU being transmitted from the AP in a downlink multi-user transmission scheme from the AP, the ACK policy value for the downlink PPDU is selected, by the AP, from a second set of allowable ACK policy values for the downlink multi-user transmission scheme, wherein the second set of allowable ACK policy values comprises the first ACK policy value, the second ACK policy value, and the third ACK policy value, and
   wherein a use of the first set of allowable ACK policy values and the second set of allowable ACK policy values is based on whether the uplink multi-user transmission scheme is used or the downlink multi-user transmission scheme is used.

8. The method according to claim 7, wherein the ACK policy value for the uplink PPDU received based on the trigger frame is set to the first ACK policy value.

9. An access point (AP) configured to receive uplink Physical layer Protocol Data Units (PPDUs) from a plurality of stations (STAs) in an uplink multi-user transmission scheme in a wireless local area network (WLAN) system, the AP comprising:
   at least one transceiver;
   at least one processor; and
   at least one computer memory operably connected to the processor and storing instructions that, based on being executed by the at least one processor, perform operations comprising:

transmitting a trigger frame to the plurality of STAs; and
receiving an uplink PPDU from the plurality of STAs in the uplink multi-user transmission scheme,
wherein two bits of the uplink PPDU are set to an acknowledgement (ACK) policy value, wherein the two bits are arranged in an ACK policy subfield in a Quality of Service (QoS) control field of the uplink PPDU,
wherein the ACK policy value for the uplink PPDU received from the plurality of STAs is from among a first set of allowable ACK policy values for the uplink multi-user transmission scheme,
wherein the first set of allowable ACK policy values comprises a first ACK policy value representing a 'normal ACK' or 'an implicit block ACK request,' and a second ACK policy value representing a 'no ACK',
wherein the first set of allowable ACK policy values excludes a third ACK policy value representing 'Block ACK',
wherein based on a downlink PPDU being transmitted from the AP in a downlink multi-user transmission scheme from the AP, the ACK policy value for the downlink PPDU is selected, by the AP, from a second set of allowable ACK policy values for the downlink multi-user transmission scheme, wherein the second set of allowable ACK policy values comprises the first ACK policy value, the second ACK policy value, and the third ACK policy value, and
wherein a use of the first set of allowable ACK policy values and the second set of allowable ACK policy values is based on whether the uplink multi-user transmission scheme is used or the downlink multi-user transmission scheme is used.

10. The AP according to claim 9, wherein the ACK policy value for the uplink PPDU received based on the trigger frame is set to the first ACK policy value.

\* \* \* \* \*